(12) United States Patent
Harsukhlal Sodha et al.

(10) Patent No.: US 10,983,786 B2
(45) Date of Patent: Apr. 20, 2021

(54) AUTOMATICALLY EVALUATING SOFTWARE PROJECT REQUIREMENTS

(71) Applicant: ACCENTURE GLOBAL SOLUTIONS LIMITED, Dublin (IE)

(72) Inventors: Rakeshkumar Harsukhlal Sodha, Pune (IN); Mihir Nanal, Pune (IN); Sasmita Pattajoshi, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 56 days.

(21) Appl. No.: 16/531,884

(22) Filed: Aug. 5, 2019

(65) Prior Publication Data
US 2020/0057632 A1 Feb. 20, 2020

(30) Foreign Application Priority Data
Aug. 20, 2018 (IN) .............................. 201811031164

(51) Int. Cl.
*G06K 9/00* (2006.01)
*G06F 8/70* (2018.01)
(Continued)

(52) U.S. Cl.
CPC .............. *G06F 8/70* (2013.01); *G06F 40/205* (2020.01); *G06K 9/6262* (2013.01);
(Continued)

(58) Field of Classification Search
CPC ....... G06F 8/70; G06F 40/205; G06K 9/6262; G06K 9/6267; G06K 9/6297; G06K 9/00879; G06N 3/08; H04Q 2213/343
See application file for complete search history.

(56) References Cited

U.S. PATENT DOCUMENTS 8,495,576 B2 * 7/2013 Ndem ................. G06F 11/3604
717/124
8,732,109 B1 * 5/2014 Carson .................. G06Q 10/10
706/47
(Continued)

OTHER PUBLICATIONS

Choetkiertikul et al., A Deep Learning Model for Estimating Story Points, Jan. 12, 2018 (Year: 2018).*
(Continued)

*Primary Examiner* — Chat C Do
*Assistant Examiner* — Noor Alkhateeb
(74) *Attorney, Agent, or Firm* — Mannava & Kang, P.C.

(57) ABSTRACT

Examples for automatically evaluating a software project requirement are disclosed. In an example, a neural word vector corresponding to a requirement file is generated and the neural word vector based on a score based vector is updated. An output vector comprising a conditional probability distribution of a plurality of answers associated with a plurality of questions identified from the updated neural word vector is generated. Further, a set of input parameters associated with at least one of the software project and the requirement is obtained. Based on the output vector and the set of input parameters, an effort required for completing the requirement may be estimated. A validation score associated with the requirement based on the output vector and a plurality of validation and classification parameters may be determined.

17 Claims, 12 Drawing Sheets

(51) Int. Cl.
*G06N 3/08* (2006.01)
*G06K 9/62* (2006.01)
*G06F 40/205* (2020.01)

(52) U.S. Cl.
CPC ......... *G06K 9/6267* (2013.01); *G06K 9/6297* (2013.01); *G06N 3/08* (2013.01)

(56) References Cited

U.S. PATENT DOCUMENTS

| | | | |
|---|---|---|---|
| 10,453,144 B1* | 10/2019 | McRae | G06Q 40/06 |
| 2016/0180200 A1* | 6/2016 | Vijayanarasimhan | G06N 3/082 382/157 |
| 2017/0243112 A1* | 8/2017 | Ekambaram | G06N 3/0454 |
| 2018/0329884 A1* | 11/2018 | Xiong | G06N 3/0445 |
| 2020/0027034 A1* | 1/2020 | Banerjee | G06N 3/0445 |

OTHER PUBLICATIONS (Fong, "Software Requirements Classification using Word Embedding and Convolution Neural Networks", Jun. 2018) (Year: 2018).*

* cited by examiner

AUTOMATICALLY EVALUATING SOFTWARE PROJECT REQUIREMENTS

PRIORITY CLAIM

This application claims priority from Indian provisional application number 201811031164, filed on Aug. 20, 2018, the disclosure of which is incorporated by reference in its entirety herein.

TECHNICAL FIELD

The present disclosure relates to software development and project management and, in particular, relates to systems and methods for automated estimation of requirements in a software development and project management lifecycle.

BACKGROUND

In the field of software development and management, an important initial phase is of Requirements Engineering (RE). RE is the phase that deals with the process of defining, documenting and maintaining requirements during the engineering design process. A requirement may refer to a description of user expectation of new or modified product features. The end objective of the software development lifecycle is to meet these expectations as closely as possible and by spending an optimum amount of effort in the development of a product, which is reasonably error-free. The effort to be spent on the development of the product may be estimated using the process of Software development Effort Estimation (EE) and may be expressed in terms of person-hours or money. The effort estimates may then be used as input to project plans, iteration plans, budgets, investment analyses, pricing processes and bidding rounds. Generally, effort estimation is a very time-consuming process.

The current models of software development generally follow an agile methodology, in which various estimates related to project execution may be expressed in terms of a metric known as a story point. The story point may be used to determine or estimate the difficulty of implementing a given story. Some of the elements that may be considered in assigning a story point include the complexity of the story, the number of unknown factors and the potential effort required to implement it. For agile project management, estimation of effort in executing the project is also calculated on the basis of story points and the requirements available as inputs drive the accuracy of the estimation.

As the development of a software system proceeds through different phases, it is often the case that errors introduced at an early phase are not detected until a subsequent phase. These undetected errors may in turn become a chronic and costly problem because the cost of correcting software errors multiplies during subsequent development phases. There is therefore a need to automate the process of requirement engineering and classify the requirements to avoid human errors and bias and also to compute more accurate estimation of the effort required to develop software or modify software.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an example embodiment, a computer-implemented method for automatically evaluating a software project requirement is disclosed. The method comprises generating a neural word vector corresponding to a requirement file, where the requirement file comprises a text description of a requirement associated with the software project. The method further comprises updating the neural word vector based on a score based vector, where the score based vector comprises a plurality of words contextually relevant to the neural word vector. The method further comprises providing the updated neural word vector as an input to a neural network engine. The method further comprises generating, by the neural network engine, an output vector comprising a conditional probability distribution of a plurality of answers associated with a plurality of questions identified from the updated neural word vector, the generating comprising determining of a plurality of relationships between a plurality of features of the requirement, the determining comprising passing of data from a first layer and a hidden layer to a second layer of the neural network engine. The method further comprises obtaining a set of input parameters associated with at least one of the software project and the requirement. The method further comprises estimating effort required for completing the requirement based on the output vector and the set of input parameters, the effort being estimated in measurable units. The method further comprises determining a validation score associated with the requirement based on the output vector and a plurality of validation and classification parameters, wherein the validation score is indicative of a quality of the requirement.

In further example embodiments, a system and a non-transitory computer readable medium for implementing the aforementioned method are also disclosed.

BRIEF DESCRIPTION OF THE DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present disclosure relates to systems and methods for automated software requirements estimation and validation. Although the overview is explained with respect to one of the systems of the present disclosure, the overview is equally applicable to other implementations, without departing from the scope of the present disclosure.

The systems and methods disclosed herein may provide an automated model for predicting the effort estimates for a software project based on a given set of input requirements. In an example embodiment, the software project may be based on an agile software development model. In other example embodiment, other software development models may be used such as, for example, a waterfall model, a rapid prototyping model, an incremental development model, a spiral model and any other software development model.

In some example embodiments, the automated model for predicting effort estimates disclosed herein may be based on Deep Learning and Machine Learning Technology. The automated model based on deep learning and machine learning technology may be used for different stages of a software development lifecycle, such as, for example, requirement validation, requirement classification and effort estimation generation.

In an example embodiment, the automated model for effort estimation disclosed herein may save time in the effort estimation phase of a software development lifecycle, which is otherwise a very time-consuming and costly process. This may further help to improve overall quality and productivity of software project deliverables for the IT industry, leading to better customer satisfaction levels for IT organizations.

Furthermore, the methods and systems disclosed herein may be used for efficient project planning, task allocation, budget allocation, revenue forecasting and pricing. This may further aid IT organizations in providing timely and predictable product deliveries, predictable cost and schedule estimates, and reduced time to market for their customers. All these may be achieved with the use of deep learning and rule based semantic validation technologies.

Figure 1:
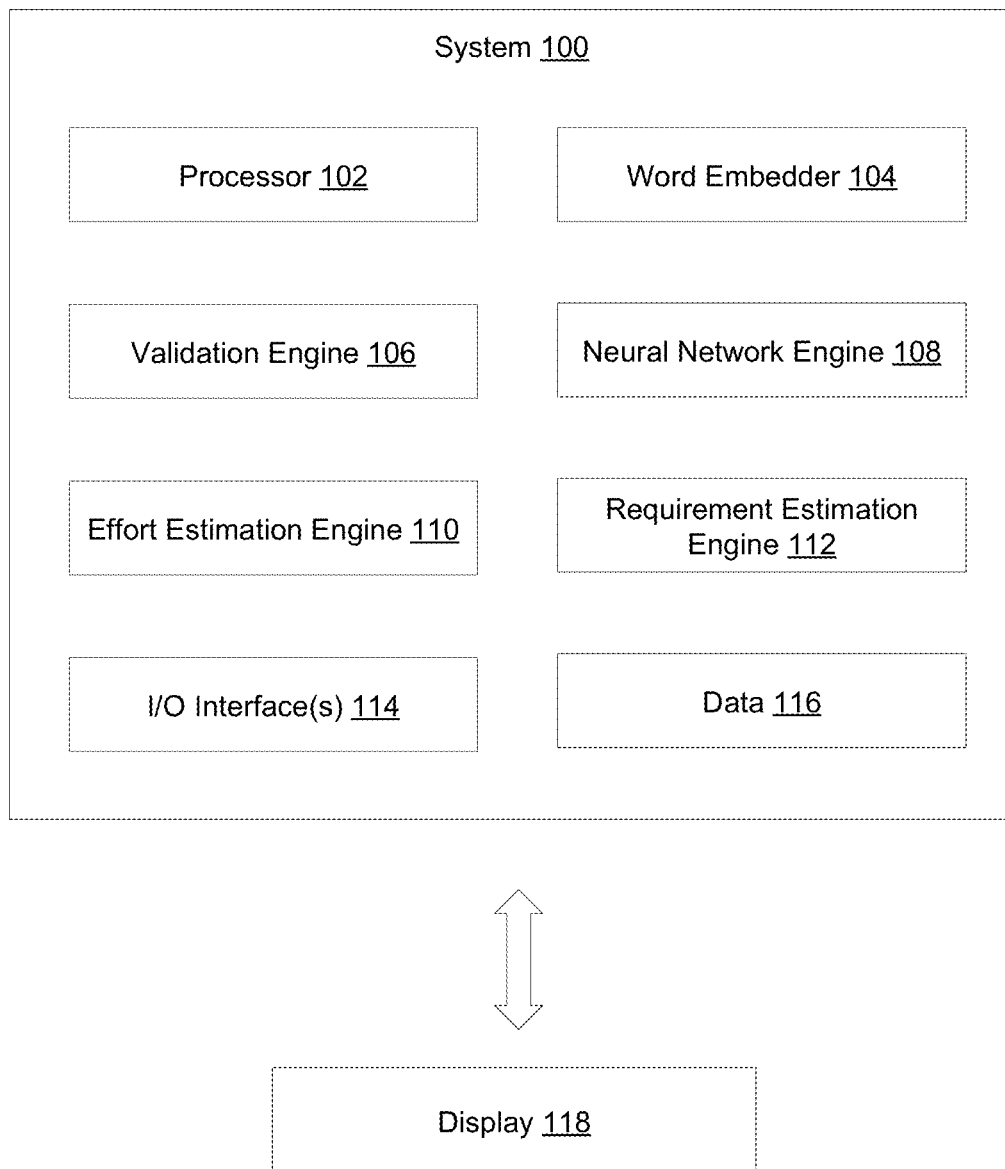
FIG. 1 illustrates a block diagram of a system for automatically evaluating a software project requirement, according to an example embodiment of the present disclosure.

FIG. 1 illustrates a block diagram of a system 100 for automatically evaluating a software project requirement, according to an example embodiment of the present disclosure. The system 100 may be implemented in enterprises, such as an Information Technology (IT) enterprise or a software solution enterprise for estimating efforts associated with new software projects or development of existing software projects.

The system 100 includes a processor 102, a word embedder 104, a validation engine 106, a neural network engine 108, an effort estimation engine 110, and a requirement estimation engine 112. Each of the word embedder 104, the validation engine 106, the neural network engine 108, the effort estimation engine 110, and the requirement estimation engine 112 is coupled to the processor 102.

The system 100 further includes I/O interfaces 114 and data 116. Amongst other things, the I/O interfaces 114 facilitate interconnection and interoperability of the system 100 with one or more of peripheral devices, peripheral interfaces. The data 116, amongst other things, includes routines, sub-routines, training data, test data, programs, machine learning techniques/algorithms, data generated by the aforementioned components of system 100, and the like. Furthermore, as shown, the system 100 is coupled to a display 118 for displaying content, for example, to a user.

According to an embodiment of the present disclosure, a user may seek to perform an evaluation associated with a software project. Herein, the evaluation may relate to the development of a new software or a component thereof. In said embodiment, the user may provide a requirement file as an input to the system 100. Without limitation, the requirement file may be understood as a file comprising a text description of a requirement associated with the software project. In an example, the user may input the requirement file using interfaces, such as JIRA interface or Rational interface. Furthermore, the requirement file may be stored in a cloud storage, an enterprise storage, and the like. Using the aforementioned interfaces, or any other interfaces, the user may provide the requirement file 100 as an input to the system 100.

Once the requirement file is received, the word embedder 104 may generate a neural word vector (NWV) corresponding to a requirement file. In an example, the word embedder 104 may generate the NWV using a natural language processing and segmentation technique, such as Word2Vec technique.

The NWV is subsequently provided as an input to the validation engine 106 wherein, the NWV is updated based on a Score Based Vector (SBV). The SBV may be understood as a word vector comprising a plurality of words contextually relevant to the NWV. In other words, in the SBV, words that are contextually relevant to the requirement have higher weightage. In an example, the NWV is updated based on the SBV using predefined scoring rules. A detailed description of the updating of the NWV is provided in conjunction with the flow diagram of FIG. 4.

Once the NWV is updated, the updated NWV is provided as an input to the neural network engine 108. In an example embodiment, the neural network engine 108 may be a Recurrent Neural Network (RNN) implementing Long Short Term Memory (LSTM) classifier. In said example embodiment, the neural network engine 108 may include a first layer and a second layer. As may be understood, the neural network engine 108 may include more than two layers as well.

According to an example embodiment of the present disclosure, the neural network engine 108 may determine a plurality of relationships between a plurality of features of the requirement. As may be understood, a feature may be an individual measurable property or characteristic of a phenomenon being observed. In an example embodiment, bag of words or sentence similarities may be used as feature. Furthermore, in an example, the weights of the nodes are trained to identify the context of the requirement, sets of questions, and sets of answers.

Accordingly, in an example, the neural network engine 108 takes as input, the updated NWV and formulates sets of questions and answers that are contextually relevant to the requirement specified in the requirement file. Furthermore, the neural network engine 108 may identify a plurality of relationships spread across the requirement file using the LSTM classifier. To this end, the neural network 108 may pass data associated with the requirement from the first layer and a hidden layer to the second layer of the neural network engine 108.

Post the aforementioned processing, an output vector is generated. The output vector comprises a conditional probability distribution of a plurality of answers associated with a plurality of questions identified from the updated NWV.

In an example embodiment, the effort estimation engine 110 may estimate the effort required for completing the requirement based on the output vector. In said example embodiment, the effort estimation engine 110 obtains a set of input parameters associated with the software project and the requirement. Examples of the parameters may include, but are not limited to, Multisite adjustment, Project phase type (Design/build/test), and percentage of contingency, relative complexity index of technology. In an example, the input parameters are obtained as a user input provided by the user. Herein, the user may select the parameters from a predetermined set of parameters, as per the requirement.

Once the set of input parameters are obtained, the effort estimation engine 110 may provide the output vector and the set of input parameters as an input to a hidden markov model. In an example, the hidden markov model may comprise three states, where each state of the three states includes a set of three Gaussians. Thereafter, the effort estimation engine 110 may dynamically select a state having a maximum likelihood and may determine a weighted average of the selected state as the effort required for completing the requirement. The effort required is determined in measurable units, such as, for example, story points or man-hours.

Furthermore, in an example embodiment, the effort estimation engine 110 may classify the requirement into a predetermined category. Examples of the predetermined category may include, but are not limited to, priority and complexity. In said example embodiment, the effort estimation engine 110 may convert the output vector to the updated neural word vector. Thereafter, the effort estimation engine 110 may map the updated neural word vector to one or more attributes of the requirement. Examples of the attributes may include, but are not limited to, original context of the requirement, sentences, and original words. Subsequently, the effort estimation engine 110 may determine a number of question and answers in the requirement based on the one or more attributes.

Based on the number of questions and answers, the effort estimation engine 110 then determines a value of each of the plurality of validation and classification parameter. Examples of the validation and classification parameters may include, but are not limited to, a number of impacted systems, a number of characters, a number of tokens, and a number of keywords. The validation and classification parameters are subsequently compared with a corresponding threshold value by the effort estimation engine 110. Based on this comparing, the effort estimation engine 110 then classifies the requirement into a predetermined category.

In an example embodiment, the requirement estimation engine 112 may determine a validation score indicative of a quality of the requirement. In said example embodiment, the requirement estimation engine 112 determines the validation score based on the output vector and the validation and classification parameters. Once the validation and classification parameters are determined, the requirement estimation engine 112 determines a plurality of probabilities related to the requirement based on one or more of the plurality of validation and classification parameters and a regression operation. Subsequently, the requirement estimation engine 112 selects a highest probability from the plurality of probabilities as the validation score for the requirement.

Figure 2:
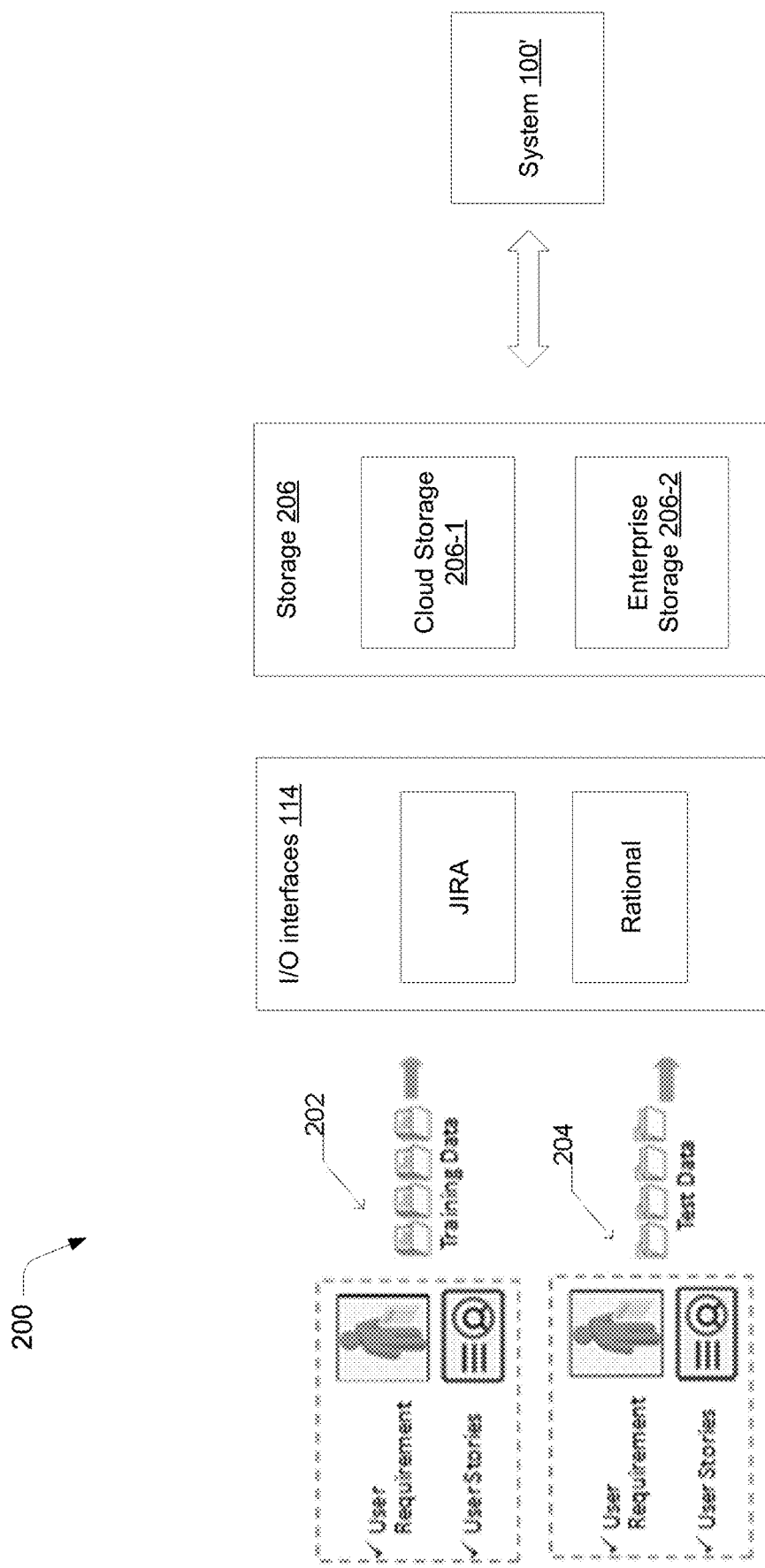
FIG. 2 illustrates a system architecture 200, according to an embodiment of the present disclosure.

FIG. 2 illustrates a system architecture 200, according to an embodiment of the present disclosure. The system architecture 200 shows implementation of a system 100', similar to the system 100 of FIG. 1. In the system 100', one or more of the components of the system 100 have been showed outside the system 100. As would be appreciated, one or more components of the system 100 may be implemented in a distributed manner, such as, for example, as depicted in FIG. 2.

The system architecture 200 depicts input data in the form of a training dataset 202 and a test dataset 204, which may be provided as inputs to the system 100', using the I/O interface 114. The training dataset 202 and the test dataset 204 may be derived from documents such as user requirements document, or user stories document, for providing to the I/O interface 114. The I/O interface 114 may be any of the input interfaces available in the art, such as JIRA, Rational and the like. The inputs may then be provided to a data storage component 206. In an example embodiment, the data storage component 208 may be a cloud storage or an enterprise storage.

The stored inputs may then be processed by the components of the system 100' to provide automated effort estimation based on the inputs. As an example, the system 100' may include the word embedder 104, the validation engine 106, the neural network engine 108, the effort estimation engine 110, and the requirement estimation engine 112.

The word embedder 104 may use the stored inputs in the form of user stories and/or user requirements stored in various documents to perform neural word embedding. Neural word embedding may be used in combination with a rule based semantic validation technique implemented by the validation engine 106 to update a NWV, which may in turn be provided to a neural network. For example the updated NWV may be provided to the neural network engine 108. for determination of relationships amongst the features of the input requirement and for weight training of the nodes.

In an example, the classifiers of the neural network engine 108 may be generated on the basis of a Long Short Term Memory (LSTM) component, which may be implemented in the form of multiple layers.

In an example, the effort estimation engine 110 may be based on a Hidden Markov Model (HMM) for estimation and prediction of automated effort estimates in accordance with the methods and systems disclosed herein.

In an example, the system 100 may provide enhancement over existing requirement gathering and effort estimation systems, which rely on manual efforts for estimation, and thus are more complex for a user to work on.

In an example, the system 100 may be used for automating estimation of efforts for any type of input model such as COCOMO, FPA, and the like. The inputs 202-204 may be prepared for any selected model, and then using the system 100, output efforts may be automatically predicted.

Figure 3:
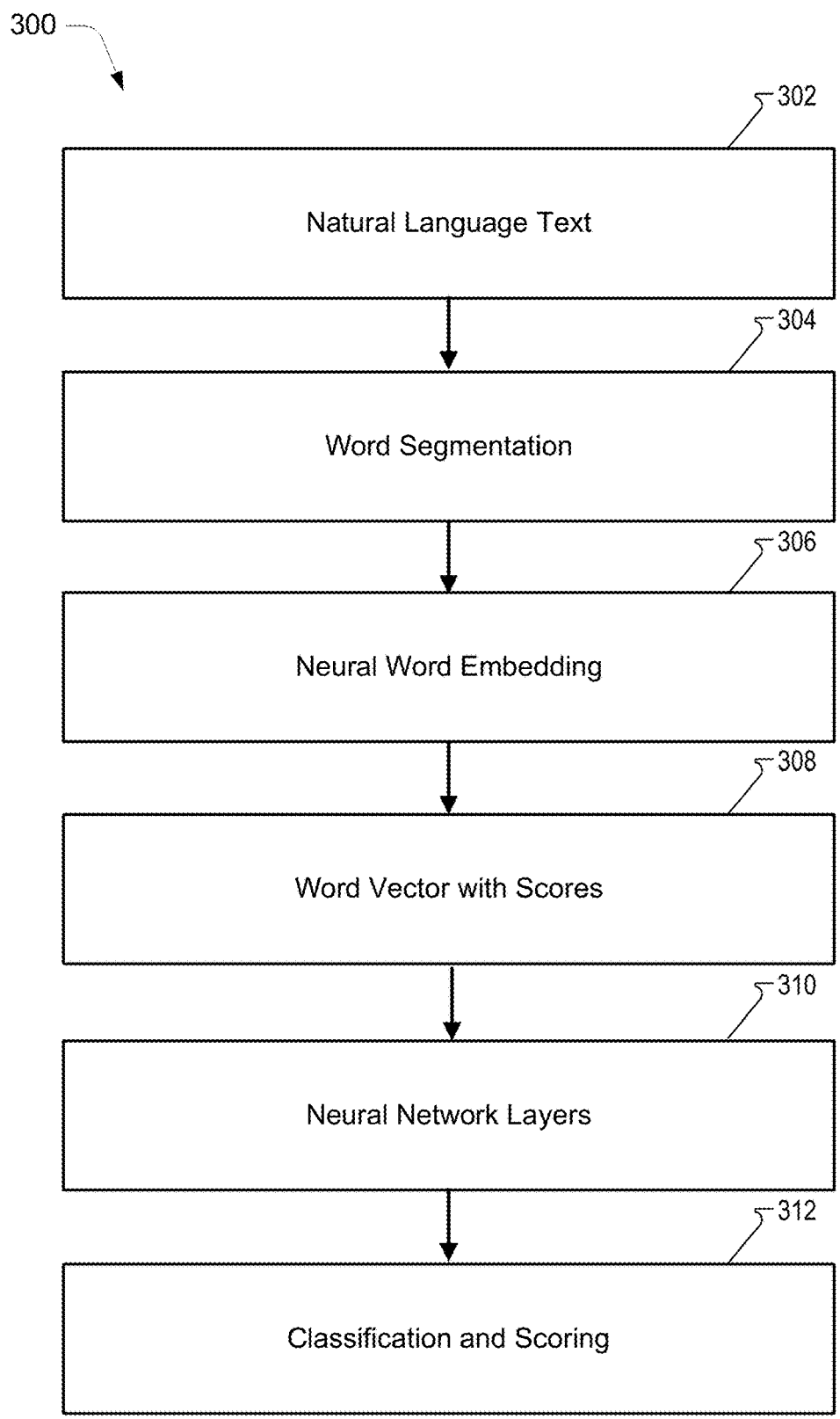
FIG. 3 illustrates a flow diagram of a deep learning method for score generation for automated effort estimation, according to an example embodiment of the present disclosure.

FIG. 3 illustrates a flow diagram of a deep learning method 300 for score generation for automated effort estimation, according to an example embodiment of the present disclosure.

The method 300 may include, at 302, extracting natural language text from a set of input documents, such as user requirement documents and user stories. The natural language text extracted from user documents is then used, at 304, for performing word segmentation on the extracted natural language text. The segmentation may in turn be used, at 306, for performing neural word embedding. Further, the method 300 may include, at 308, generating a word vector with scores, such as based on the neural word embedding and a set of scoring rules. Thereafter, the word vector with scores is used for processing in the neural network layers, at 310. The output of the processing by the neural network layers is a classification vector, which is generated at step 312, along with propagation of the scoring rules for performing rue based semantic validation of the requirement data.

In an example, the rule based semantic validation may be performed on the basis of the word vector with scores generated in step 308. The generation of the word vector with scores may be done in accordance with the method illustrated in FIG. 4.

Figure 4:
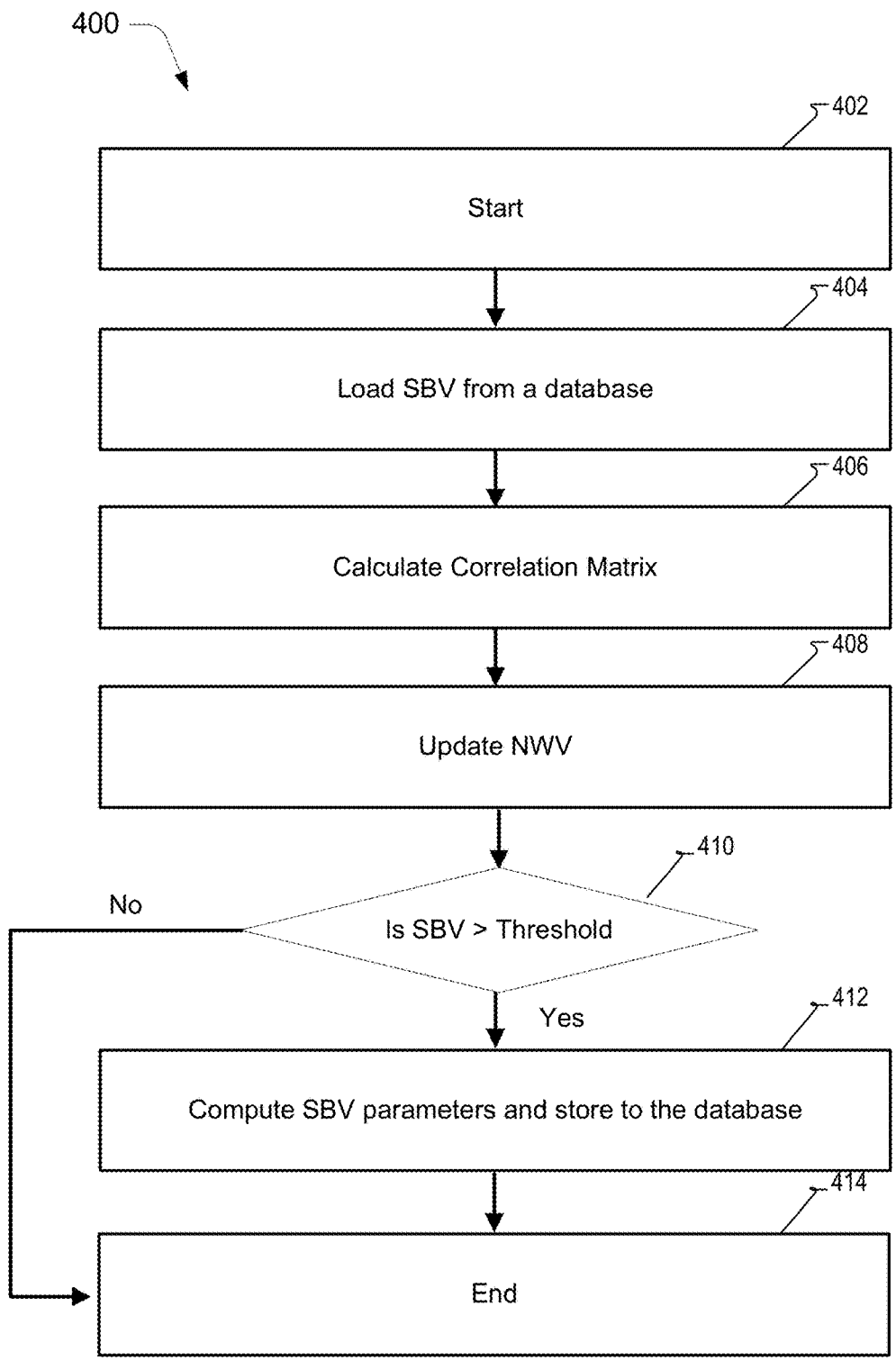
FIG. 4 illustrates a flow diagram of method for a score based vector calculation generation for automated effort estimation, according to an example embodiment of the present disclosure.

FIG. 4 illustrates a flow diagram of method for 400 a score based vector calculation generation for automated effort estimation, according to an example embodiment of the present disclosure.

The method 400 may include, at 402, starting with a conventional neural word vector (NWV) as an input to the method 400. The method 400 may further include, at 404, loading a score based vector, such as from a database. In an example embodiment, the score based vector may be the score based vector generated by the validation engine 106 illustrated in FIG. 1, on the basis of the set of scoring rules. Further, the method 400 may include, at 406, calculating a correlation matrix between the score based vector (SBV) and the neural word vector (NWV).

In an example, the correlation matrix between the SBV and the NWV may be calculated on the basis of the following formulas:

$NWV \in R^{D \times N} \rightarrow$ Vector of dimension $D$ $SBV \in R^{P \times N} \rightarrow$ Vector of dimension $P$ $A \in \{0,1\}^{D \times P} \rightarrow$ Vector of Alignment Matrix Correlation Calculation: $A | \Sigma a_{ij} \leq 1 \Sigma_{i=1}^{D} \Sigma_{j=1}^{P} r(x_i, s_j) * a_{ij}$ Once the correlation matrix between the NWV and the SBV is calculated, the method 400 may further include, at 408, updating the NWV on the basis of the correlation matrix. Then, at 410, the SBV is checked against a predetermined SBV threshold. If the SBV has reached the predetermined threshold, then at 412, the SBV parameters are recomputed and stored in a database, otherwise, the method 400 proceeds towards end, at 414.

In an example embodiment, the steps (402-414) of the method 400 may be performed by one or more components of the system 100.

In an example embodiment, the method 400 may be used to perform rule based semantic validation of user stories on the basis of neural word embedding vector with scores and validation scores. In an example embodiment, the semantic rules for performing scoring may be stored in semantic rules storage, such as the data 116.

Figure 5A:
FIG. 5A illustrates an exemplary user interface for implementation of the method for automated effort estimation, according to an example embodiment of the present disclosure.
Figure 5B:
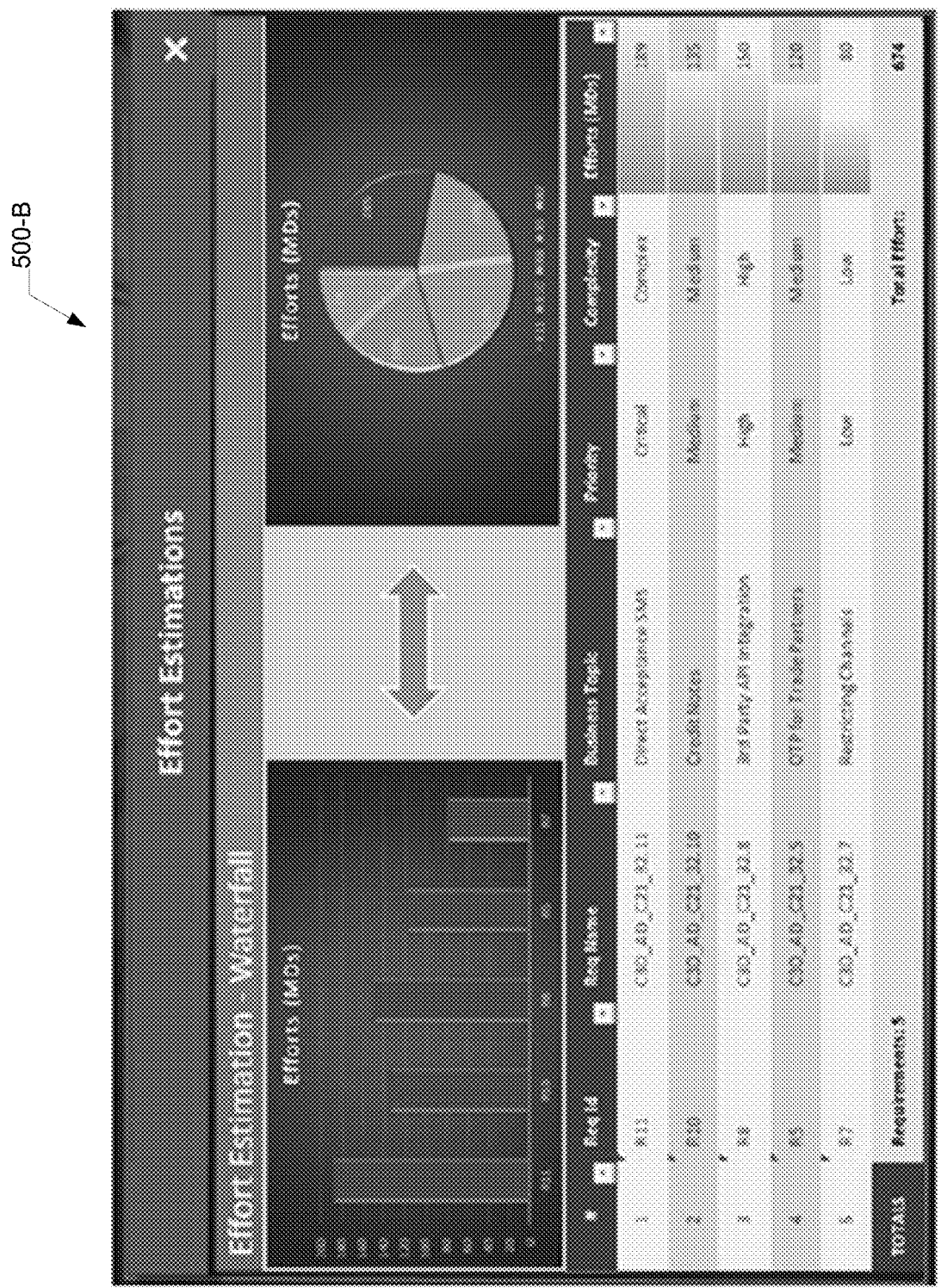
FIG. 5B illustrates another exemplary user interface for implementation of the method for automated effort estimation, according to an example embodiment of the present disclosure.
Figure 5C:
FIG. 5C illustrates another exemplary user interface for implementation of the method for automated effort estimation, according to an example embodiment of the present disclosure.

FIGS. 5A-5C illustrate exemplary user interfaces for visualization of scoring and validation results for automated effort estimation in a project management lifecycle, according to exemplary embodiments discussed earlier.

FIG. 5A illustrates an exemplary user interface 500a for implementation of the method for automated effort estimation and for visualization of requirement scores generated for a set of five requirements. FIG. 500a also illustrates a rating generated for each requirement on the basis of generated score vector.

FIG. 5B illustrates another exemplary user interface 500b illustrating generation of effort estimates, in terms of number of man days (MDs) for each of the five requirements illustrated earlier.

FIG. 5C illustrates another exemplary user interface 500c illustrating generation of story points for each of the five requirements illustrated earlier on the basis of the estimations performed using methods 300 and 400.

In an example embodiment, the rule based semantic validation discussed in conjunction with FIGS. 1-4 may be used to automate the effort estimation process with the use of a Hidden Markov Model (HMM) at each stage. The HMM Model may be configured to learn the parameters for the rule based validation and improve over time to improve the overall accuracy of the estimation process, across different technologies. Further, the HMM based estimation with self-tuning of parameters may also be used to perform effort estimation to story point conversion with greater accuracy in accordance with the example embodiments disclosed herein.

Figure 6:
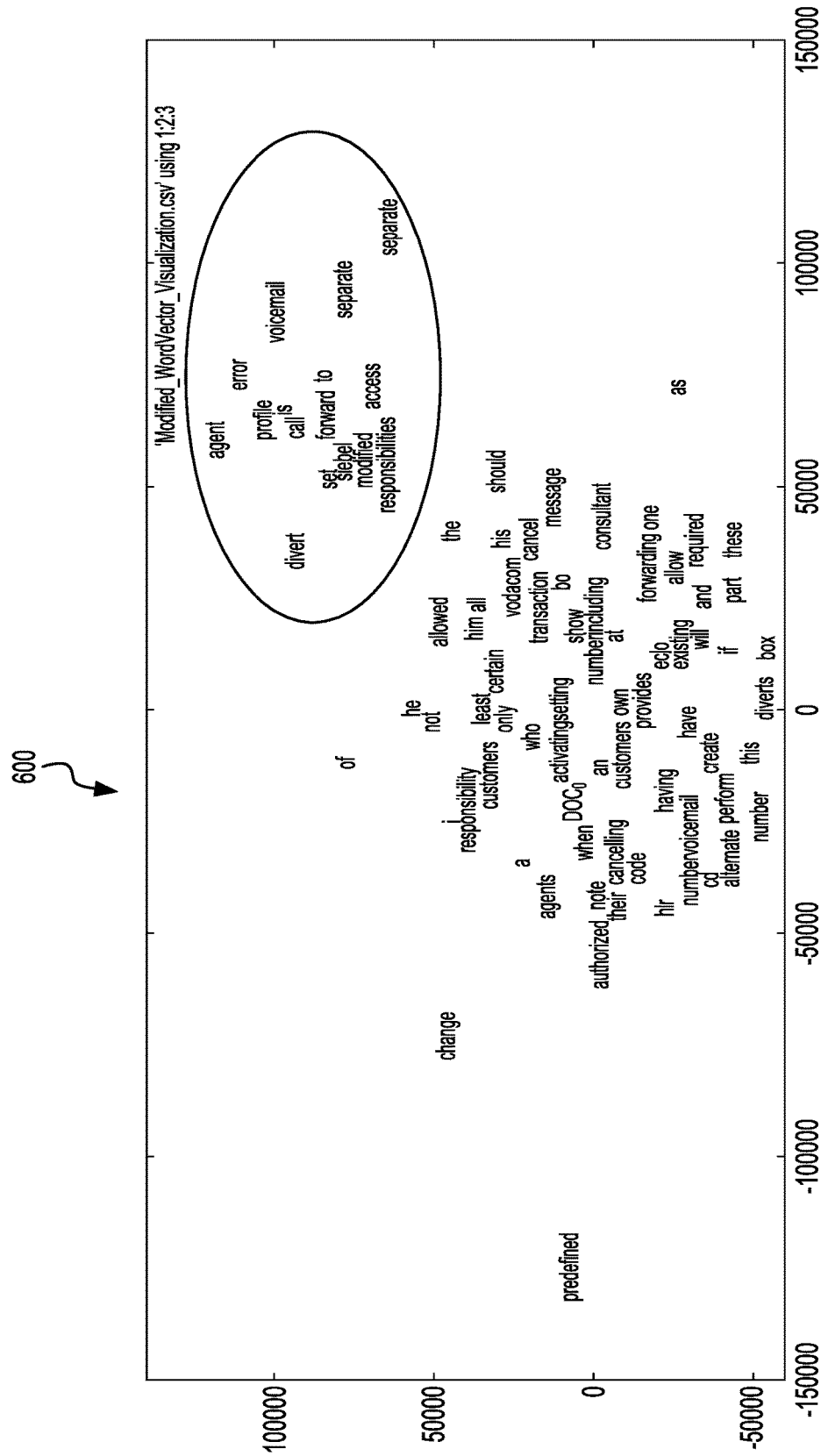
FIG. 6 illustrates an exemplary output of a word vector based on the implementation of the automated effort estimation method, according to an example embodiment of the present disclosure.

FIG. 6 illustrates an exemplary output of a word vector 600 generated on the basis of the automated effort estimation methods disclosed herein, according to an example embodiment.

The word vector 600 illustrates that using the method of rule based semantic validation disclosed herein, the word count of more relevant words in the requirements (illustrated as encircled), is enhanced, thereby leading to more accurate classification of requirements.

On the contrary, using conventional validation techniques, based on Conventional Deep learning techniques like Convolutional Neural Network (CNN) fails to establish the relationship with words or sentences far from the current context being evaluated by the layers. However, the classification methods disclosed in the present disclosure are based on a Recurrent Neural Network (RNN). Further, the Long Short Term Memory (LSTM) disclosed herein may be configured to extract the information of a plurality of requirement features during training and learning process of a deep learning model, such as the HMM. Further, the LSTM may be used to establish the relationship among requirement statements spread across an input document.

In an example, the LSTM may be designed as multiple layers such that low level features of the requirements are extracted by the initial LSTM layer.

Further, higher level features of the requirements may be extracted by subsequent LSTM layers. In this manner, an n-Layer architecture may be designed to support multiple features and information may be passed between the multiple layers in order to establish a context between the different requirement features.

Further, in some example embodiments, the logic for implementing the LSTM layers may include a forget gate, which may be used decay the information, such as previous information, for automated effort estimation.

Figure 7:
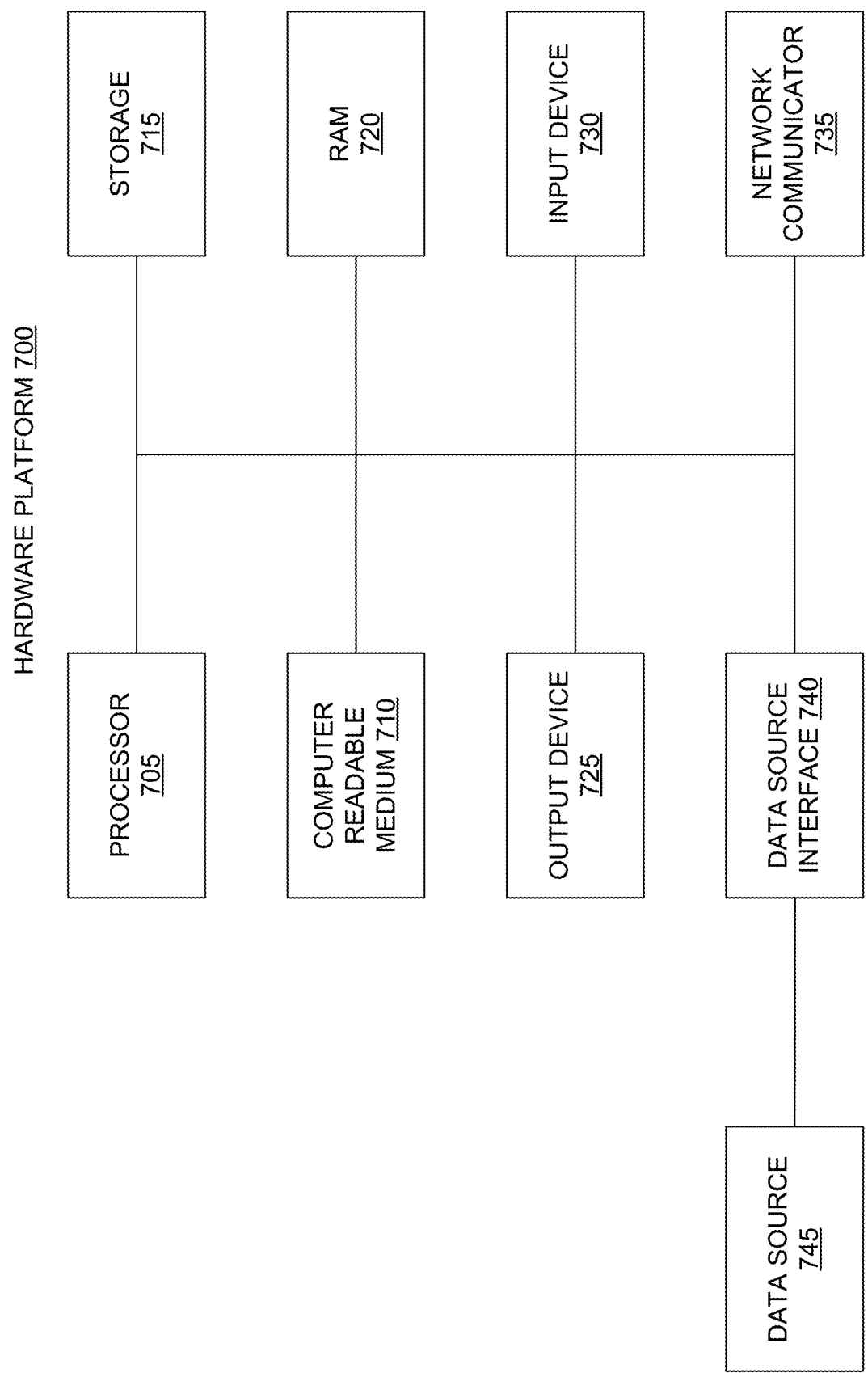
FIG. 7 illustrates a hardware platform for implementation of the system, according to an example of the present disclosure.

FIG. 7 illustrates a hardware platform for implementation of the system 100, according to an example of the present disclosure. In an example embodiment, the hardware platform 700 may be a computer system 700 that may be used with the examples described herein. The computer system 700 may represent a computational platform that includes components that may be in a server or another computer system. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 700 may include a processor 705 that executes software instructions or code stored on a non-transitory computer readable storage medium 710 to perform methods of the present disclosure. The software code includes, for example, instructions to obtain data, reconcile data, generate confidence score, and perform summarization.

The instructions on the computer readable storage medium 710 are read and stored the instructions in storage 715 or in random access memory (RAM) 720. The storage 715 provides a large space for keeping static data where at least some instructions could be stored for later execution. The stored instructions may be further compiled to generate other representations of the instructions and dynamically stored in the RAM 720. The processor 705 reads instructions from the RAM 720 and performs actions as instructed.

The computer system 700 further includes an output device 725 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 700 further includes input device 730 to provide a user or another device with mechanisms for entering data and/or otherwise interacts with the computer system 700. The input device may include, for example, a keyboard, a keypad, a mouse, or a touchscreen. In an embodiment, output of the evaluation of the requirement associated with a software project is displayed on the output device 725. Each of these output devices 725 and input devices 730 could be joined by one or more additional peripherals.

A network communicator 735 may be provided to connect the computer system 700 to a network and in turn to other devices connected to the network including other clients, servers, data stores, and interfaces, for instance. A network communicator 735 may include, for example, a network adapter such as a LAN adapter or a wireless adapter. The computer system 700 includes a data source interface 740 to access data source 745.

Figure 8:
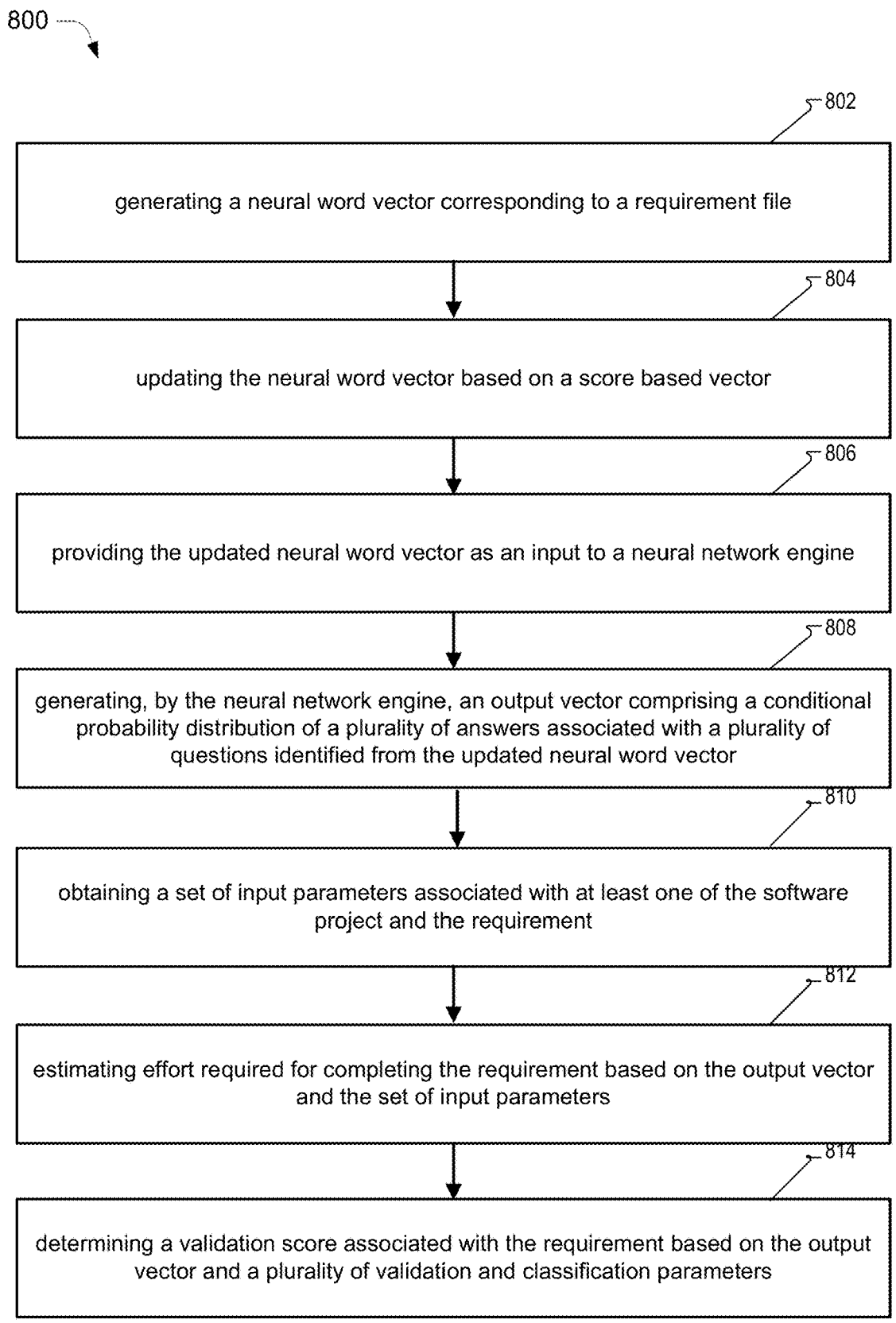
FIG. 8 illustrates a method automatically evaluating a software project requirement, according to an example embodiment of the present disclosure.

FIG. 8 illustrates a computer-implemented method 800 for automated effort estimation, depicting the functionality of the system 100 according to an example embodiment. For the sake of brevity, construction and operational features of the system 100, which are explained in detail in the description of FIGS. 1-7 are not explained in detail in the description of FIG. 8.

At method block 802, the method 800 commences by generating a neural word vector corresponding to a requirement file. In an example, the neural word vector is generated using a word embedding and segmenting technique, such as, for example, a Word2Vec technique. In an example, the word embedder 104 is configured to generate the neural word vector corresponding to the requirement file.

At block 804, the neural word vector is updated based on a score based vector. Herein, the score based vector is a vector comprising words relevant to the context of the requirement. In an example, the validation engine 106 is configured to update the neural word vector based on the score based vector, as explained above. At block 806, the updated neural word vector is provided as an input to a neural network engine, such as the neural network engine 108.

At block 808, the neural network engine generates an output vector comprising a conditional probability distribution of a plurality of answers associated with a plurality of questions identified from the updated neural word vector. To this end, the neural network engine may determine a plurality of relationships between a plurality of features of the requirement. Furthermore, in an example, the weights of the nodes of the neural network engine are trained to identify the context of the requirement, sets of questions, and sets of answers. Accordingly, the neural network engine formulates sets of questions and answers that are contextually relevant to the requirement specified in the requirement file based on the updated NWV. Furthermore, the neural network engine implements an LSTM classifier for identifying relationships spread across the requirement file. Accordingly, the neural network may pass data associated with the requirement from the first layer and a hidden layer to the second layer of the neural network engine. Post the aforementioned processing, the output vector is generated.

At block 810, a set of input parameters associated with at least one of the software project and the requirement are obtained. In an example, the effort estimation engine 110 may obtain the set of input parameters associated with the software project and the requirement. Examples of the parameters may include, but are not limited to, Multisite adjustment, Project phase type (Design/build/test), percentage of contingency, relative complexity index of technology. In an example, the input parameters are obtained as a user input provided by the user. Herein, the user may select the parameters from a predetermined set of parameters, as per the requirement.

At block 812, efforts required for completing the requirement are estimated based on the output vector and the set of input parameters. In an example, the effort estimation engine 110 may estimate the effort required for completing the requirement based on the output vector and the set of input parameters.

Once the set of input parameters are obtained, the output vector and the set of input parameters are provided as an input to a hidden markov model. Thereafter, a state having a maximum likelihood is selected dynamically and a weighted average of the selected state is determined as the effort required for completing the requirement. The effort required is determined in measurable units, such as, for example, story points or man-hours.

Furthermore, the requirement may be classified into a predetermined category. Examples of the predetermined category may include, but are not limited to, priority and complexity. To this end, the output vector may be converted to the updated neural word vector. Thereafter, the updated neural word vector may be mapped to one or more attributes of the requirement. Examples of the attributes may include, but are not limited to, original context of the requirement, sentences, and original words. Subsequently, a number of question and answers in the requirement may be determined based on the one or more attributes. Based on the number of questions and answers, a value of each of the plurality of validation and classification parameter is determined. Examples of the validation and classification parameters may include, but are not limited to, a number of impacted systems, a number of characters, a number of tokens, and a number of keywords. The validation and classification parameters are subsequently compared with a corresponding threshold value and based on this comparison; the requirement is classified into a predetermined category. In an example embodiment, each of the threshold values may be a numeric value. In an example embodiment, a validation and classification parameter, take for example, a number of impacted system may be compared to a corresponding threshold value for the number of impacted systems to classify the requirement. In an example embodiment, a set of threshold ranges may be defined for each of the validation and classification parameters. For example, Table 1 below provides an example set of ranges.

| Set of Threshold Ranges (No. of Impacted Systems) | Category |
|---|---|
| 0-5 | Low |
| 6-10 | Medium |
| 11-15 | High |
| 16-20 | Critical |

Based on the range within which the number of impacted system as determined falls, the requirement may be classified.

At block 814, a validation score associated with the requirement is determined based on the output vector and the plurality of validation and classification parameters. The validation score is indicative of a quality of the requirement. In an example the requirement estimation engine 112 may determine the validation score based on the output vector and the validation and classification parameters. In an example embodiment, for calculating the validation score, a plurality of probabilities related to the requirement are determined based on one or more of the plurality of validation and classification parameters and a regression operation. Subsequently, a highest probability from the plurality of probabilities is selected as the validation score for the requirement.

Figure 9:
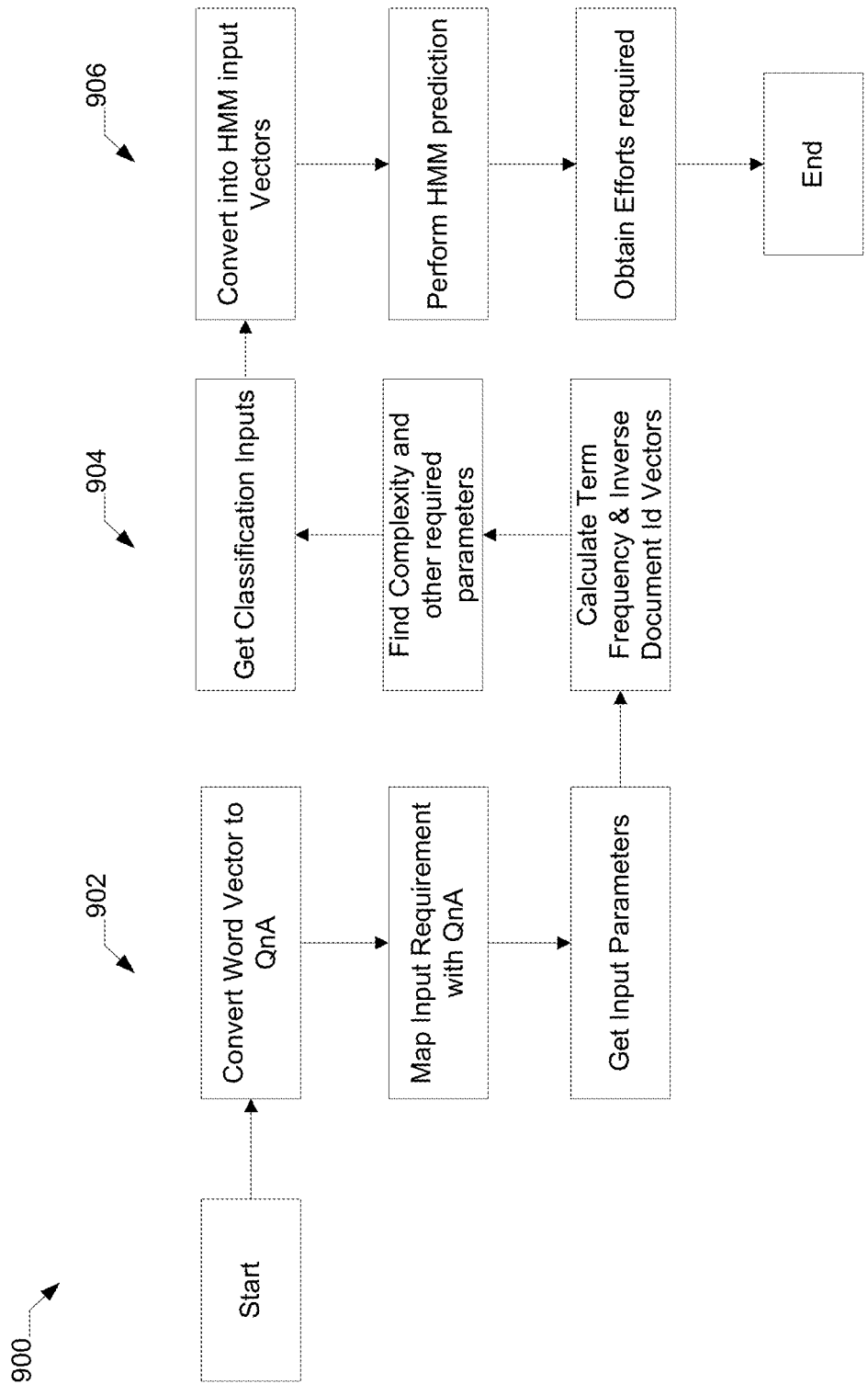
FIG. 9 illustrates a computer-implemented method 900 for estimating efforts required for completion of a requirement, according to an example embodiment of the present disclosure.

FIG. 9 illustrates a computer-implemented method 900 for estimating effort required for completion of a requirement, depicting the functionality of the system 100 according to an example embodiment. For the sake of brevity, construction and operational features of the system 100, which are explained in detail in the description of FIGS. 1-8 are not explained in detail in the description of FIG. 9.

Furthermore, for the sake of brevity, one or more of the operational blocks of the method 900 have been collectively referred to as an operation sequence. However, the same is not to be construed as a limitation to the order of execution of the operational blocks.

Once the method 900 starts, in a first operation sequence 902, the output vector of Conditional Probability Distribution is converted back into the updated NWV. Subsequently, the NWV is then mapped back to the original context and sentences associated with the requirement, where the original words are decoded from the word corpus. In an example embodiment, the word corpus is based on the text description provided in the requirement file. Furthermore, the input parameters are also obtained in said operation sequence.

Thereafter, the method proceeds to operation sequence 904, wherein a classification gate is implemented. In said sequence, Term Frequency-Inverse Document Frequency (TF-IDF) technique is applied on the original context and as a result data, for example, insights into number of Question/Answers present in the input requirement is obtained. Based on the input parameters and aforementioned data, complexity and other required parameters are ascertained and classification inputs are also calculated. In an example embodiment, classification of the input requirement is calculated based on TF-IDF. For example, a number of matching Question/Answer present on the input requirement.

In an example embodiment, the TF-IDF classification i.e. Number of QnA, and the input parameters are passed as HMM input vectors into the HMM model, in an operation sequence 906. In said sequence, based on the input parameters, the HMM model does the dynamic state selection and maximum likelihood state is selected. Subsequently, a weighted average of the selected state is calculated as output effort required for the requirement.

Figure 10:
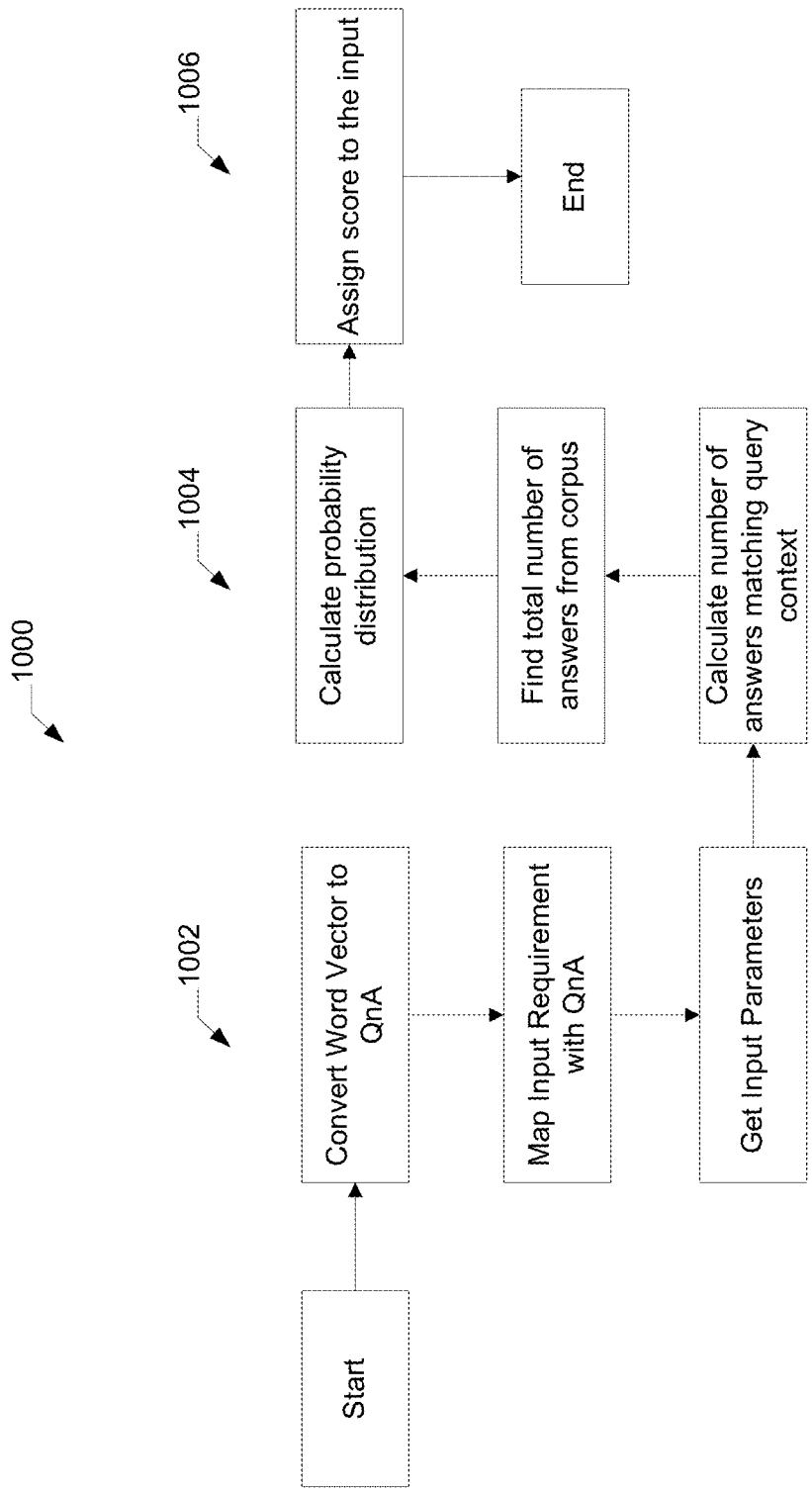
FIG. 10 illustrates a computer-implemented method for determining a validation score associated with a requirement, according to an example embodiment of the present disclosure.

FIG. 10 illustrates a computer-implemented method 1000 for determining a validation score associated with a requirement, depicting the functionality of the system 100 according to an example embodiment. For the sake of brevity, construction and operational features of the system 100, which are explained in detail in the description of FIGS. 1-9 are not explained in detail in the description of FIG. 10.

Furthermore, for the sake of brevity, one or more of the operational blocks of the method 1000 have been collectively referred to as an operation sequence. However, the same is not to be construed as a limitation to the order of execution of the operational blocks.

Once the method 1000 starts, in a first operation sequence 1002, the output vector of Conditional Probability Distribution is converted back into the updated NWV. Subsequently, the NWV is then mapped back to the original context and sentences associated with the requirement, where the original words are decoded from the word corpus. In an example embodiment, the word corpus is based on the text description provided in the requirement file. Furthermore, the validation and classification parameters are also obtained in said operation sequence.

Subsequently, in a second operation sequence 1004, a validation gate is implemented. In an example embodiment, the validation gate may calculate a number of answers matching query context. Furthermore, in an example embodiment, the validation gate may then find a total number of answers in the corpus. In an example, based on the Exact Match Question and Answer pairs, a number of Token and a number of Keyword may also be extracted.

Subsequently, a regression operation is performed on the number of Token/Keywords to find the probability of the requirement with nearest matching score in the scale of 1 to 10.

Thereafter, the method moves to operation sequence 1006, where a regression output with the highest probability is provided as the final score for the input requirement.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A computer-implemented method for automatically evaluating a software project requirement, the method comprising:
   generating a neural word vector corresponding to a requirement file, wherein the requirement file comprises a text description of a requirement associated with the software project;
   updating the neural word vector based on a score based vector, wherein the score based vector comprises a plurality of words contextually relevant to the neural word vector;
   providing the updated neural word vector as an input to a neural network engine;
   generating, by the neural network engine, an output vector comprising a conditional probability distribution of a plurality of answers associated with a plurality of questions identified from the updated neural word vector, the generating comprising determining of a plurality of relationships between a plurality of features of the requirement, the determining comprising passing of data from a first layer and a hidden layer to a second layer of the neural network engine;
   obtaining a set of input parameters associated with at least one of the software project and the requirement;
   estimating effort required for completing the requirement based on the output vector and the set of input parameters, the effort being estimated in measurable units; and
   determining a validation score associated with the requirement based on the output vector and a plurality of validation and classification parameters, wherein the validation score is indicative of a quality of the requirement, wherein the determining of the validation score comprises:
      converting the output vector to the updated neural word vector;
      mapping the updated neural word vector to one or more attributes of the requirement;
      determining a number of question and answers in the requirement based on the one or more attributes;
      determining a value of each of the plurality of validation and classification parameters based on the number of questions and answers;
      determining a plurality of probabilities related to the requirement based on one or more of the plurality of validation and classification parameters and a regression operation; and
      selecting a highest probability from the plurality of probabilities as the validation score for the requirement.

2. The method of claim 1, further comprising:
   comparing the classification parameter values with corresponding threshold values; and
   classifying the requirement into a predetermined category based on the comparing.

3. The method of claim 1, the estimating further comprising:
   providing the output vector and the set of input parameters as an input to a hidden markov model;
   dynamically selecting a state having a maximum likelihood; and
   determining a weighted average of the selected state as the effort required for completing the requirement.

4. The method of claim 3, wherein the hidden markov model comprises three states, and wherein each state of the three states includes a set of three Gaussians.

5. The method of claim 1, wherein the updating of the neural word vector further comprises:
   loading the score based vector from an internal database;
   calculating a correlation matrix between the neural word vector and the score based vector; and
   updating the neural word vector based on the correlation matrix.

6. The method of claim 1, wherein the determining of the plurality of relationships between the plurality of features of the requirement comprises implementing a Long Short Term Memory (LSTM) Classifier.

7. A system for automatically evaluating a software project requirement, the system comprising:
   a processor;
   a word embedder coupled to the processor to generate a neural word vector corresponding to a requirement file, wherein the requirement file comprises a text description of a requirement associated with the software project;
   a validation engine coupled to the processor to update the neural word vector based on a score based vector, wherein the score based vector comprises a plurality of words contextually relevant to the neural word vector;
   a neural network engine coupled to the processor to generate an output vector comprising a conditional probability distribution of a plurality of answers associated with a plurality of questions identified from the updated neural word vector, the generating comprising determining of a plurality of relationships between a plurality of features of the requirement, the determining comprising passing of data from a first layer and a hidden layer to a second layer of the neural network engine;
   an effort estimation engine coupled to the processor to:
      obtain a set of input parameters associated with at least one of the software project and the requirement; and
      estimate effort required for completing the requirement based on the output vector and the set of input parameters, the effort being estimated in measurable units; and
   a requirement estimation engine coupled to the processor to determine a validation score associated with the requirement based on the output vector and a plurality of validation and classification parameters, wherein the validation score is indicative of a quality of the requirement, wherein the determination of the validation score comprises:
      converting the output vector to the updated neural word vector;
      mapping the updated neural word vector to one or more attributes of the requirement;

determining a number of question and answers in the requirement based on the one or more attributes;

determining a value of each of the plurality of validation and classification parameters based on the number of questions and answers;

determining a plurality of probabilities related to the requirement based on one or more of the plurality of validation and classification parameters and a regression operation; and selecting a highest probability from the plurality of probabilities as the validation score for the requirement.

8. The system of claim 7, wherein the effort estimation engine further is to:

compare the validation and classification parameter values with corresponding threshold values; and classify the requirement into a predetermined category based on the comparing.

9. The system of claim 7, wherein the effort estimation engine further is to:

provide the output vector and the set of input parameters as an input to a hidden markov model;

select, dynamically, a state having a maximum likelihood;

determine a weighted average of the selected state as the effort required for completing the requirement.

10. The system of claim 9, wherein the hidden markov model comprises three states, and wherein each state of the three states includes a set of three Gaussians.

11. The system of claim 7, wherein the validation engine further is to:

load the score based vector from an internal database;

calculate a correlation matrix between the neural word vector and the score based vector; and update the neural word vector based on the correlation matrix.

12. The system of claim 7, wherein the neural network engine further is to implement a Long Short Term Memory (LSTM) Classifier for determining of the plurality of relationships between the plurality of features of the requirement.

13. A non-transitory computer readable medium including machine readable instructions that are executable by at least one processor to execute a method comprising:

generating a neural word vector corresponding to a requirement file, wherein the requirement file comprises a text description of a requirement associated with the software project;

updating the neural word vector based on a score based vector, wherein the score based vector comprises a plurality of words contextually relevant to the neural word vector;

providing the updated neural word vector as an input to a neural network engine;

generating, by the neural network engine, an output vector comprising a conditional probability distribution of a plurality of answers associated with a plurality of questions identified from the updated neural word vector, the generating comprising determining of a plurality of relationships between a plurality of features of the requirement, the determining comprising passing of data from a first layer and a hidden layer to a second layer of the neural network engine;

obtaining a set of input parameters associated with at least one of the software project and the requirement;

estimating effort required for completing the requirement based on the output vector and the set of input parameters, the effort being estimated in measurable units; and determining a validation score associated with the requirement based on the output vector and a plurality of validation and classification parameters, wherein the validation score is indicative of a quality of the requirement, wherein the determining of the validation score comprises:

converting the output vector to the updated neural word vector;

mapping the updated neural word vector to one or more attributes of the requirement;

determining a number of question and answers in the requirement based on the one or more attributes;

determining a value of each of the plurality of validation and classification parameters based on the number of questions and answers;

determining a plurality of probabilities related to the requirement based on one or more of the plurality of validation and classification parameters and a regression operation; and selecting a highest probability from the plurality of probabilities as the validation score for the requirement.

14. The non-transitory computer readable medium of claim 13, the method further comprising:

comparing the classification parameter values with corresponding threshold values; and classifying the requirement into a predetermined category based on the comparing.

15. The non-transitory computer readable medium of claim 13, the estimating further comprising:

providing the output vector and the set of input parameters as an input to a hidden markov model;

dynamically selecting a state having a maximum likelihood;

determining a weighted average of the selected state as the effort required for completing the requirement.

16. The non-transitory computer readable medium of claim 15, wherein the hidden markov model comprises three states, and wherein each state of the three states includes a set of three Gaussians.

17. The non-transitory computer readable medium of claim 13, wherein the updating of the neural word vector further comprises:

loading the score based vector from an internal database;

calculating a correlation matrix between the neural word vector and the score based vector; and updating the neural word vector based on the correlation matrix.

* * * * *